(12) United States Patent
Dong et al.

(10) Patent No.: US 8,203,831 B2
(45) Date of Patent: Jun. 19, 2012

(54) SLIDE MECHANISM FOR PORTABLE ELECTRONIC DEVICE

(75) Inventors: Shui-Jin Dong, Shenzhen (CN); Yu Zhang, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 441 days.

(21) Appl. No.: 12/412,511

(22) Filed: Mar. 27, 2009

(65) Prior Publication Data

US 2009/0290302 A1  Nov. 26, 2009

(30) Foreign Application Priority Data

May 21, 2008 (CN) .......................... 2008 1 0301682

(51) Int. Cl.
*H05K 7/12* (2006.01)
(52) U.S. Cl. ............ 361/679.02; 361/679.58; 455/575.4
(58) Field of Classification Search ............. 361/679.01, 361/679.02, 679.55, 679.56, 679.58, 727, 361/741, 730; 455/575.1–575.4; 379/433.11–433.13
See application file for complete search history.

(56) References Cited

U.S. PATENT DOCUMENTS

| 7,400,913 | B2 * | 7/2008 | Richter et al. ............. 455/575.1 |
| 7,773,374 | B2 * | 8/2010 | Dong et al. ............. 361/679.39 |
| 2005/0122669 | A1 | 6/2005 | Lee |
| 2007/0004395 | A1 | 1/2007 | Duan et al. |

FOREIGN PATENT DOCUMENTS

| CN | 1612575 A | 5/2005 |
| CN | 1725778 A | 1/2006 |
| CN | 1874667 A | 12/2006 |

* cited by examiner

*Primary Examiner* — Jinhee Lee
*Assistant Examiner* — Ingrid Wright
(74) *Attorney, Agent, or Firm* — Altis Law Group, Inc.

(57) ABSTRACT

A slide mechanism used in a mobile device includes a main plate, a slide plate, at least one undeformable slider, and at least one guide. The slide plate is installed on the main plate and slidable relative to the main plate. The slider is securely attached to the slide plate, and the guide is securely attached to the main plate, deformably moving the slider along. When the slide plate slides along the main plate, the slider compresses the guide, thereby generating deformation of the guide and sliding the slide plate along the main plate.

2 Claims, 6 Drawing Sheets

SLIDE MECHANISM FOR PORTABLE ELECTRONIC DEVICE

BACKGROUND

1. Technical Field

The disclosure generally relates to portable electronic devices, and, particularly, to a sliding mechanism of a portable electronic device.

2. Description of Related Art

Sliding-cover portable electronic devices are currently a popular choice for portable electronic device design. The sliding-cover portable electronic device has two nested housings, which move apart to open the portable electronic device.

A slide mechanism is generally used in such devices, driving the movement between the two housings. However, the slide mechanism is typically complex in structure and difficult to assemble, resulting in increased production costs.

Therefore, there is room for improvement within the art.

DETAILED DESCRIPTION OF EMBODIMENTS

Figure 1:
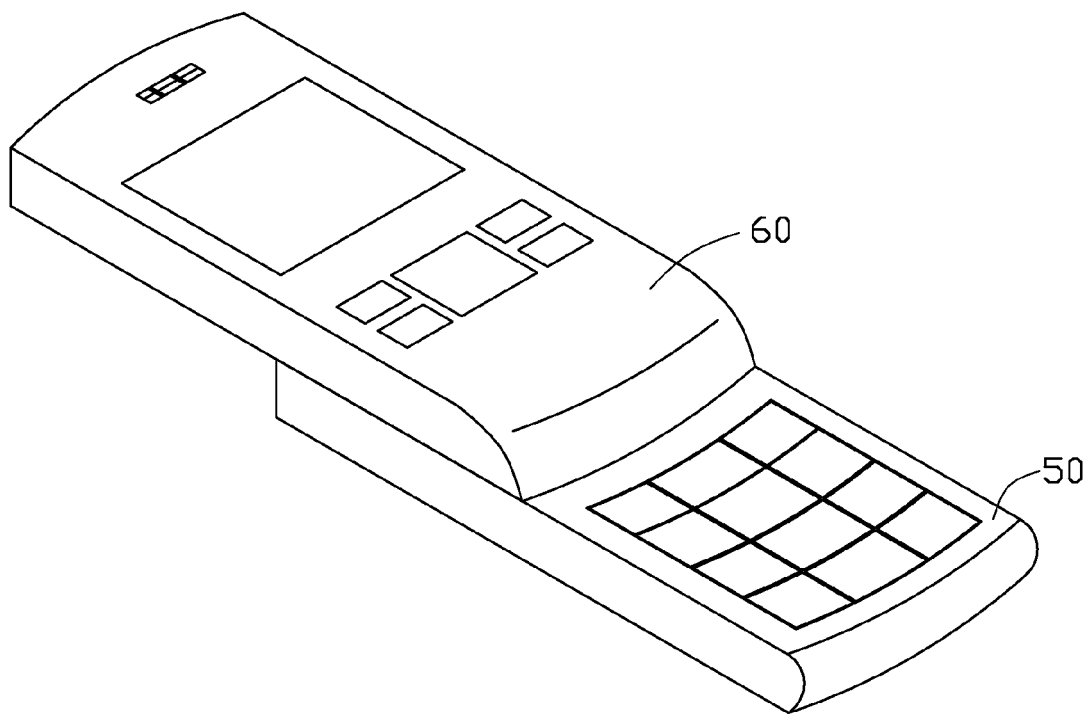
FIG. 1 is a schematic assembled view of a portable electronic device in an open position.
Figure 2:
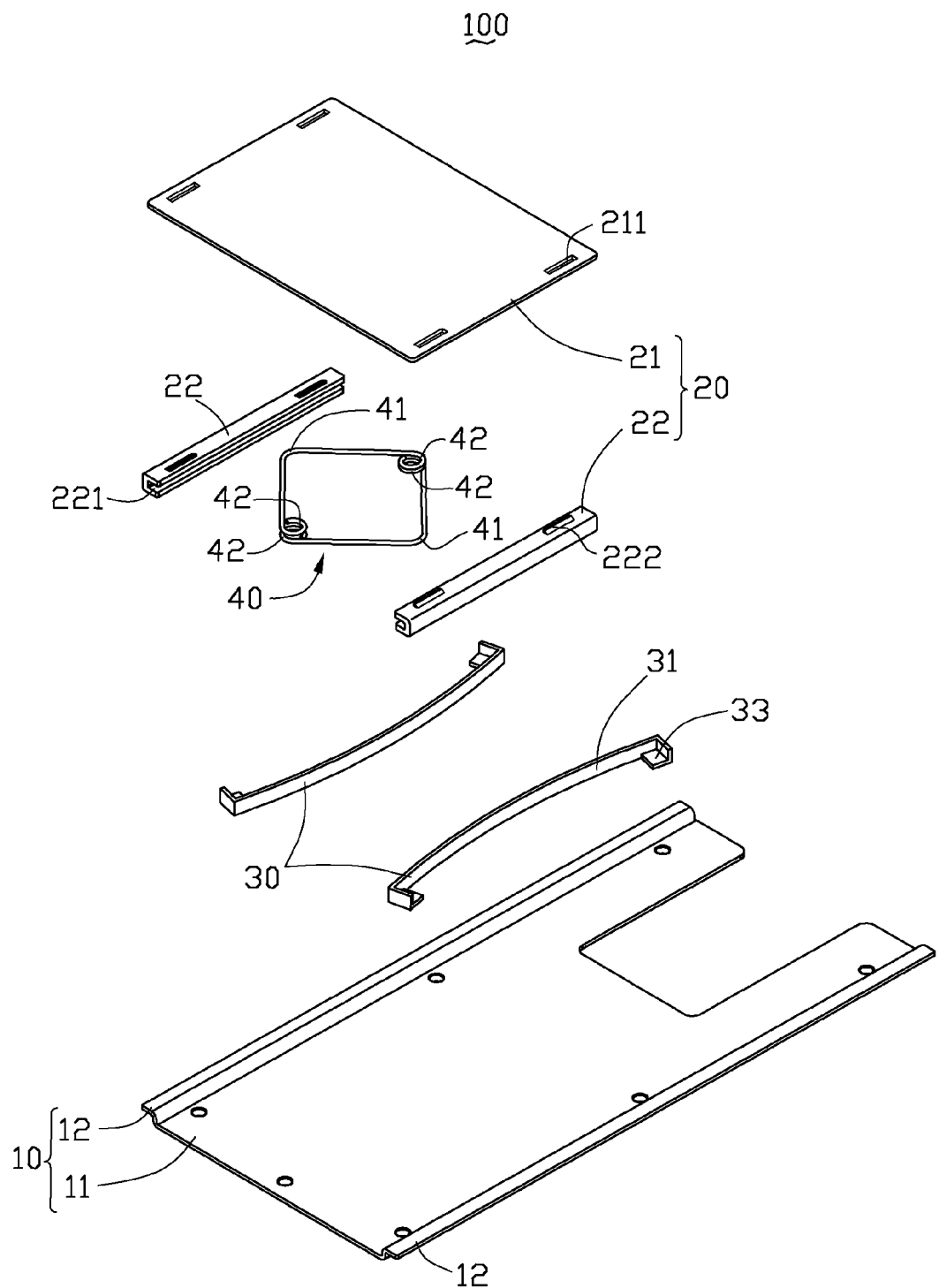
FIG. 2 is a schematic exploded view of a slide mechanism.

FIGS. 1 and 2 show an exemplary embodiment of a slide mechanism 100 used in a mobile device 300. The mobile device 300 includes a first housing 50 engaging a second housing 60.

The slide mechanism 100 includes a main plate 10, a slide plate 20, two guides 30 fixed to the main plate 10, and two sliders 40 fixed to the slide plate 20. The slide plate 20 and the main plate 10 are respectively fixed to the second housing 60 and the first housing 50. The sliders 40 slide along the guides 30, sliding the slide plate 20 relative to the main plate 10.

Figure 3:
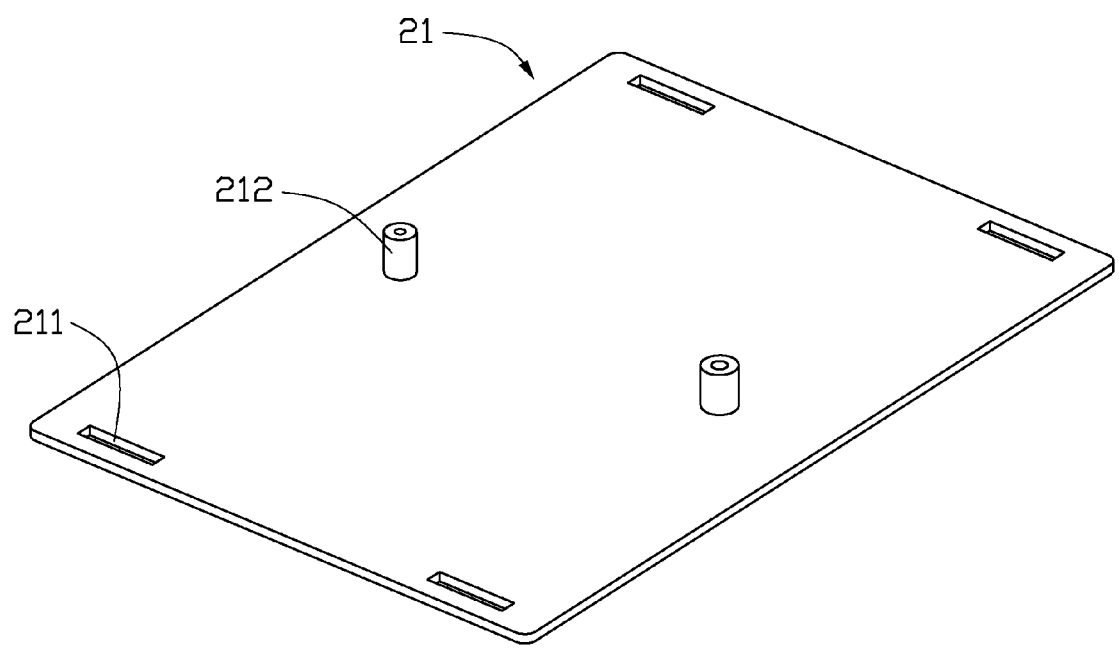
FIG. 3 is a schematic view of a slide base portion.

The main plate 10 includes a main base portion 11 and two rail portions 12. The rail portions 12 are generally L-shaped and respectively formed on two opposite sides of the main base portion 11. The slide plate 20 is shorter than the main plate 10. The slide plate 20 includes a slide base portion 21 and two slide parts 22. Four locking holes 211 are respectively defined in four corners of the slide base portion 21. The slide base portion 21 defines two locking posts 212 (shown in FIG. 3) thereon. The two slide parts 22 are generally U-shaped bars, each of which defines a slide groove 221 corresponding to one of the two rail portions 12. Each slide part 22 defines two protruding portions 222 corresponding to the locking holes 211.

Each guide 30 has a guide portion 31 and two fixing portions 33. The guide portion 31 is a curved, elastically deformable sheet. The two fixing portions 33 are respectively formed on two opposite ends of the guide portion 31. The two fixing portions 33 fix (for example, by hot-melting) the guide 30 to the main base portion 11.

Each slider 40 includes a curved slide portion 41. The curved slide portion 41 has two legs bent perpendicular, with the end of each leg terminating in a ring-shaped latching portion 42. The curved slide portions 41 of the two slider 40 are the same length and the latching portions 42 aligned with each other. The latching portions 42 securely engage the locking posts 212 to fix the sliders 40 on the slide base portion 21.

Figure 4:
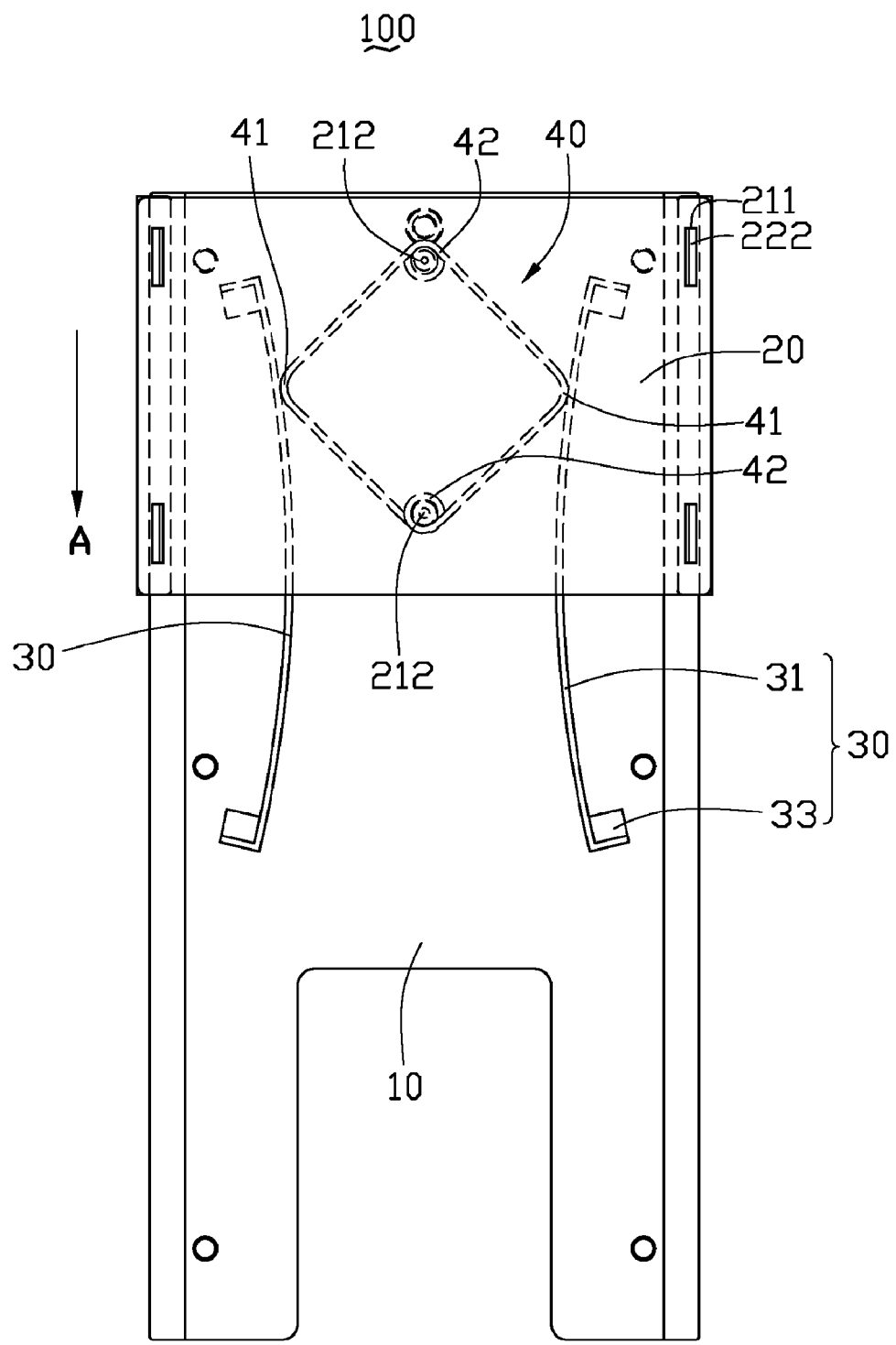
FIG. 4 is a perspective view of the slide mechanism of FIG. 2 in an open position.

Referring to FIG. 4, when the slide mechanism 100 is assembled, the guides 30 are fixed on the main plate 10 by the two fixing portions 33. The two guide portions 31 are systematically arranged on a surface of the main base portion 11. A distance between the guide portions 31 perpendicular to arrow line A is initially decreased along a direction of the arrow line A, minimized at the middle of the guide portions 31, and then increased further in the direction of the arrow line A. The sliders 40 are systematically arranged on a surface of the slide base portion 21 by engagement of the latching portions 42 with the locking posts 212. The protruding portions 222 are inserted into the locking holes 211 to fix the slide parts 22 on the same side of the slide base portion 21. The slide plate 20 covers a part of the main plate 10 and is impelled along the rail portions 12 by the sliding of the slide parts 22. The rail portions 12 are linearly and slidably received in the slide grooves 221. The guides 30 and the sliders 40 are positioned between the slide plate 20 and the main plate 10. The sliders 40 face the guides 30. The slide portions 41 engage the guide portions 31 when no compression is generated between the slide portions 41 and the guide portions 31. The sliders 40 are positioned between the guides 30. At this time, the guide portions 31 and the slide portions 41 are in their original positions. The slide mechanism 100 is open, as is the mobile device 300, correspondingly.

Figure 6:
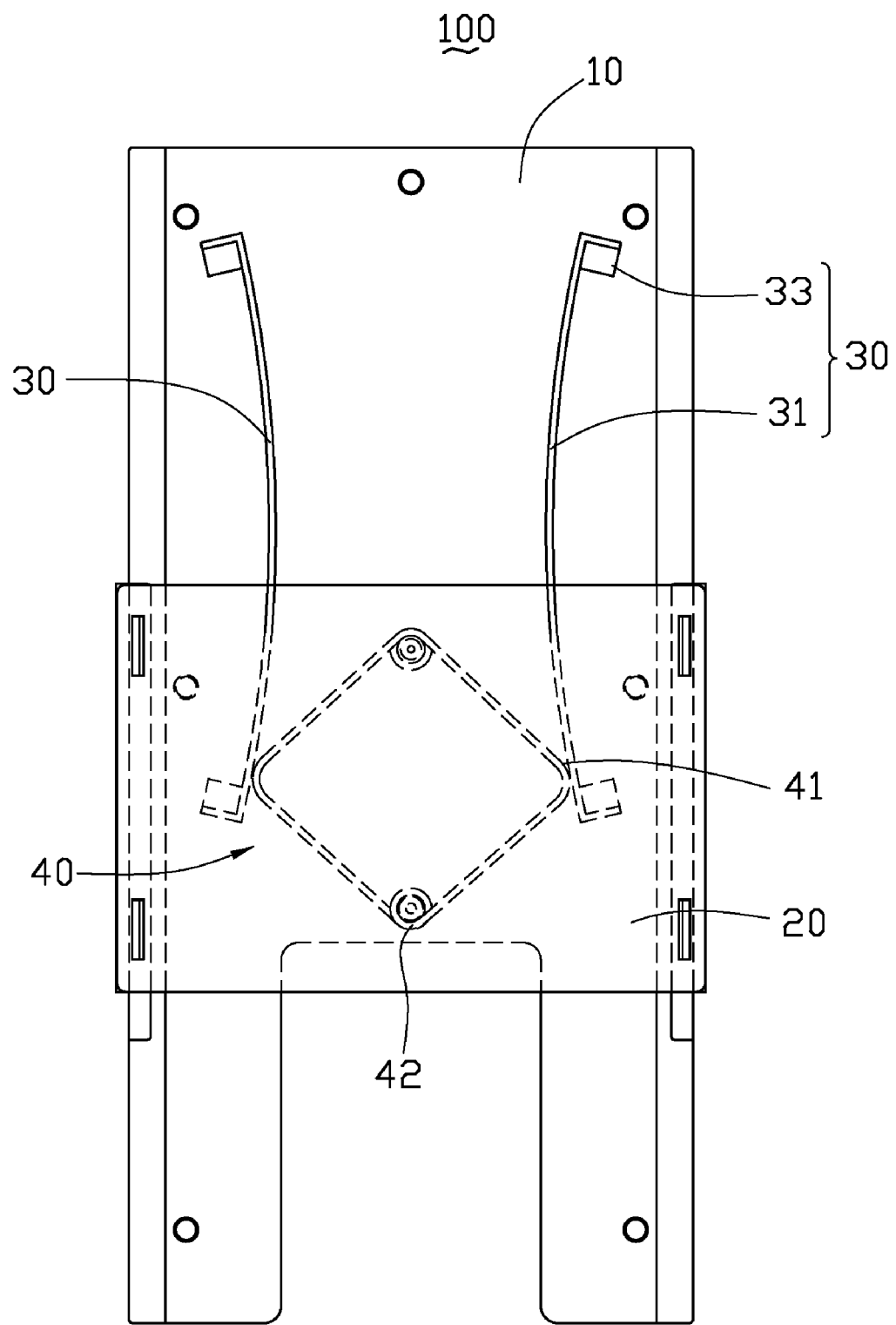
FIG. 6 is similar to FIG. 4, but shows a closed position.

Referring to FIG. 6, the slide mechanism 100 is closed, as is the portable electronic device 300, correspondingly. The slide portions 41 engage the guide portions 31 when no compression is generated therebetween.

Figure 5:
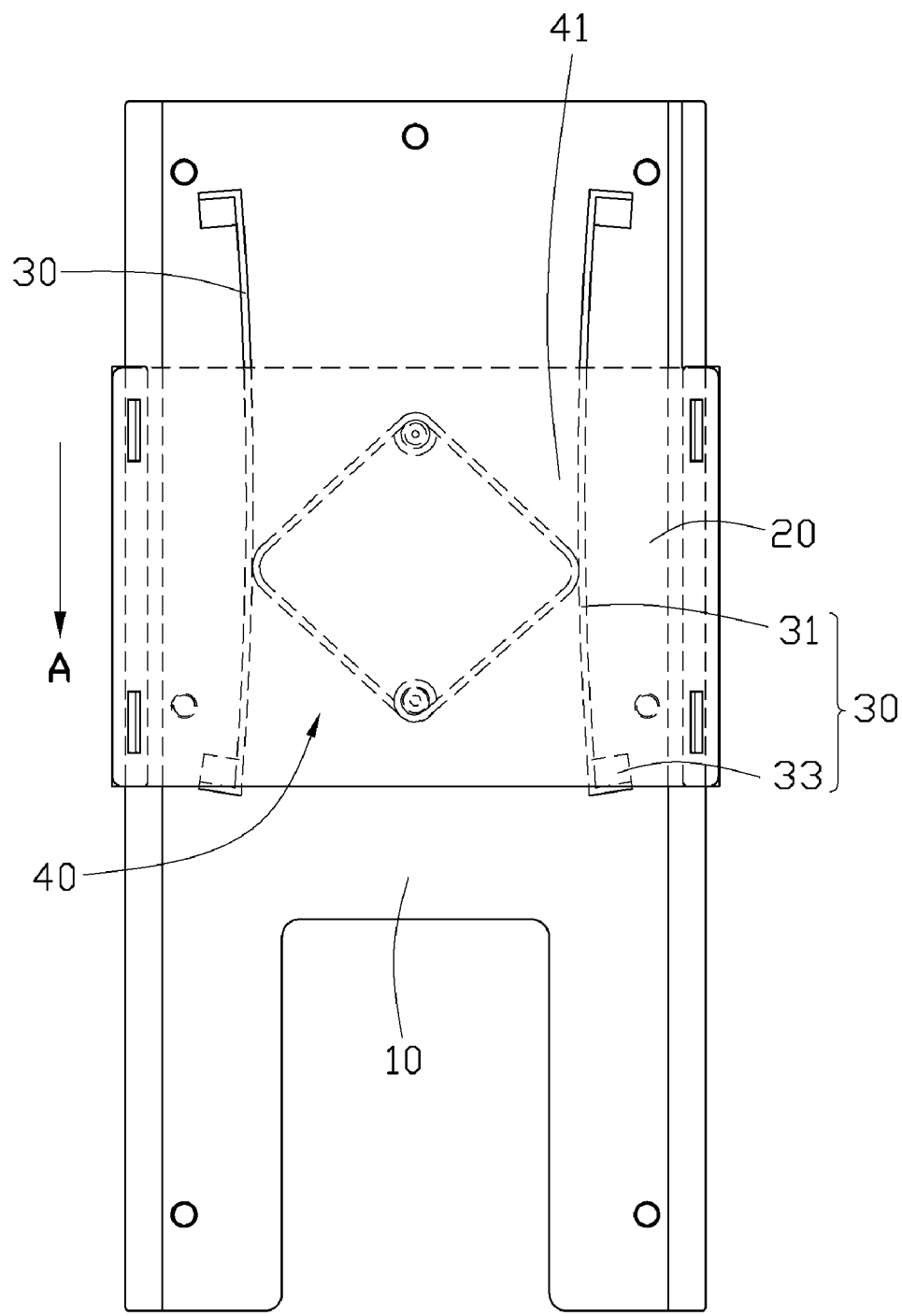
FIG. 5 is similar to FIG. 4, but shows movement from open to closed position.

Referring back to FIG. 5, when the slide mechanism 100 is moved from open to closed position, the slide plate 20 slides along the main plate 10 by external force in the direction of the arrow line A. During this stage, the slide portions 41 compress the guide portions 31. When the slide portions 41 reach the middle of the guide portions 31, the guide portions 31 are maximally deformed thereby. The slide plate 20 can further automatically slide in the direction of the arrow line A to the closed position by allowing the guide portions 31 to return to their original states.

It is to be understood that slide mechanism 100 may include only one slider, rather than the two sliders 40 as disclosed, with only one guide accordingly corresponding thereto.

It is to be understood, however, that even through numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A slide mechanism, comprising:
   a main plate;
   a slide plate installed on the main plate and slidable relative to the main plate;
   an undeformable first slider and an undeformable second slider securely attached to the slide plate, the first slider and the second slider symmetrically arranged; and
   a first guide and a second guide securely attached to the main plate, deformable by force applied thereto by the first slider and the second slider;

wherein when the slide plate slides along the main plate, the first slider and the second slider compresses and deforms the first guide and the second guide until the first guide and the second guide drive the first slider and the second slider to automatically slide, thereby sliding the slide plate along the main plate;

wherein the first slider and the second slider each comprises curved slide portions, each curved slide portion including two legs bent perpendicular, a free end of each leg terminates in a ring-shaped latching portion, and two locking posts are formed on the slide plate for engaging with the latching portions; and wherein the first guide and the second guide each comprises elastic guide portions, imposing deformation thereon by pressure exerted thereon and thus moving the first slider and the second slider therealong.

2. A portable electronic device, comprising:

a first housing;

a second housing slidably installed on the first housing;

a slide mechanism, comprising:

a main plate;

a slide plate installed on the main plate and slidable relative to the main plate;

an undeformable first slider and an undeformable second slider securely attached to the slide plate, the first slider and the slider symmetrically arranged; and a first guide and a second guide securely attached to the main plate, deformable by force applied thereto by the first slider and the second slider;

wherein when the second housing slides relative to the first housing, the slide plate slides along the main plate, the first slider and the second slider compresses the first guide and the second guide, generating deformation thereof until the first guide and the second guide drive the first slider and the second slider to automatically slide for sliding the second housing relative to the first housing;

wherein the first slider and the second slider each comprises curved slide portions, each curved slide portion including two legs bent perpendicular, a free end of each leg terminates in a ring-shaped latching portion, and two locking posts are formed on the slide plate for engaging with the latching portions; and wherein the first guide and the second guide each comprises elastic guide portions, imposing deformation thereon by pressure exerted thereon and thus moving the first slider and the second slider therealong.

* * * * *